(12) United States Patent
Ishibashi

(10) Patent No.: US 6,584,512 B1
(45) Date of Patent: Jun. 24, 2003

(54) COMMUNICATION DMA DEVICE FOR FREEING THE DATA BUS FROM THE CPU AND OUTPUTTING DIVIDED DATA

(75) Inventor: Hideki Ishibashi, Suita (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/402,108

(22) PCT Filed: May 14, 1998

(86) PCT No.: PCT/JP98/02121

§ 371 (c)(1),
(2), (4) Date: Sep. 29, 1999

(87) PCT Pub. No.: WO98/54650

PCT Pub. Date: Dec. 3, 1998

(30) Foreign Application Priority Data

May 30, 1997 (JP) ............................................. 9-142157

(51) Int. Cl.[7] .............................................. G06F 13/00
(52) U.S. Cl. ......................... 710/22; 710/66; 710/305; 710/307; 710/308; 710/313; 710/315
(58) Field of Search ........................... 710/66, 307, 22, 710/305, 308, 313, 315

(56) References Cited

U.S. PATENT DOCUMENTS

| | | | |
|---|---|---|---|
| 5,398,244 A | * 3/1995 | Mathews et al. | 370/448 |
| 5,553,310 A | * 9/1996 | Taylor et al. | 710/40 |
| 5,561,819 A | * 10/1996 | Gephardt et al. | 710/27 |
| 5,826,106 A | * 10/1998 | Pang | 710/25 |

FOREIGN PATENT DOCUMENTS

| | | |
|---|---|---|
| EP | 0 651 333 A1 | 5/1995 |
| JP | 51-080135 | 7/1976 |
| JP | 61-265653 | 11/1986 |
| JP | 1-76356 | 3/1989 |
| JP | 64-76356 | 3/1989 |
| JP | 1-181145 | 7/1989 |
| JP | 3-228163 | 10/1991 |
| JP | 3-282954 | 12/1991 |
| JP | 7-334451 | 12/1995 |

OTHER PUBLICATIONS

Supplementary European Search Report dated Nov. 7, 2001.
Office Action from Japanese Patent Office in Patent Application No. 9–142157 mailed Nov. 5, 2002 and translation.

* cited by examiner

*Primary Examiner*—Reginald G. Bragdon
*Assistant Examiner*—Mehdi Namazi
(74) *Attorney, Agent, or Firm*—Armstrong, Westerman & Hattori, LLP

(57) ABSTRACT

When the data bus is cut off from the CPU (1) and the transmission ready signal (TXRDY) is activated, the DMA control circuit (10) reads 32 bits of data at once according to the lead address of the destined area for storage in the DRAM (2) and the address width that are set by the CPU (1), and stores the data in the transmission buffer (16). The selector (17) selects 8 bits of data at a time from the transmission buffer (16), the data is written to the communication circuit (14) and thus output, the bus release request is cancelled, 8 bits of data is read at a time from transmission buffer (16), and the data is written into the communication circuit (14). When the transmission ready signal is provided once again, the above-described processing is repeated.

4 Claims, 4 Drawing Sheets

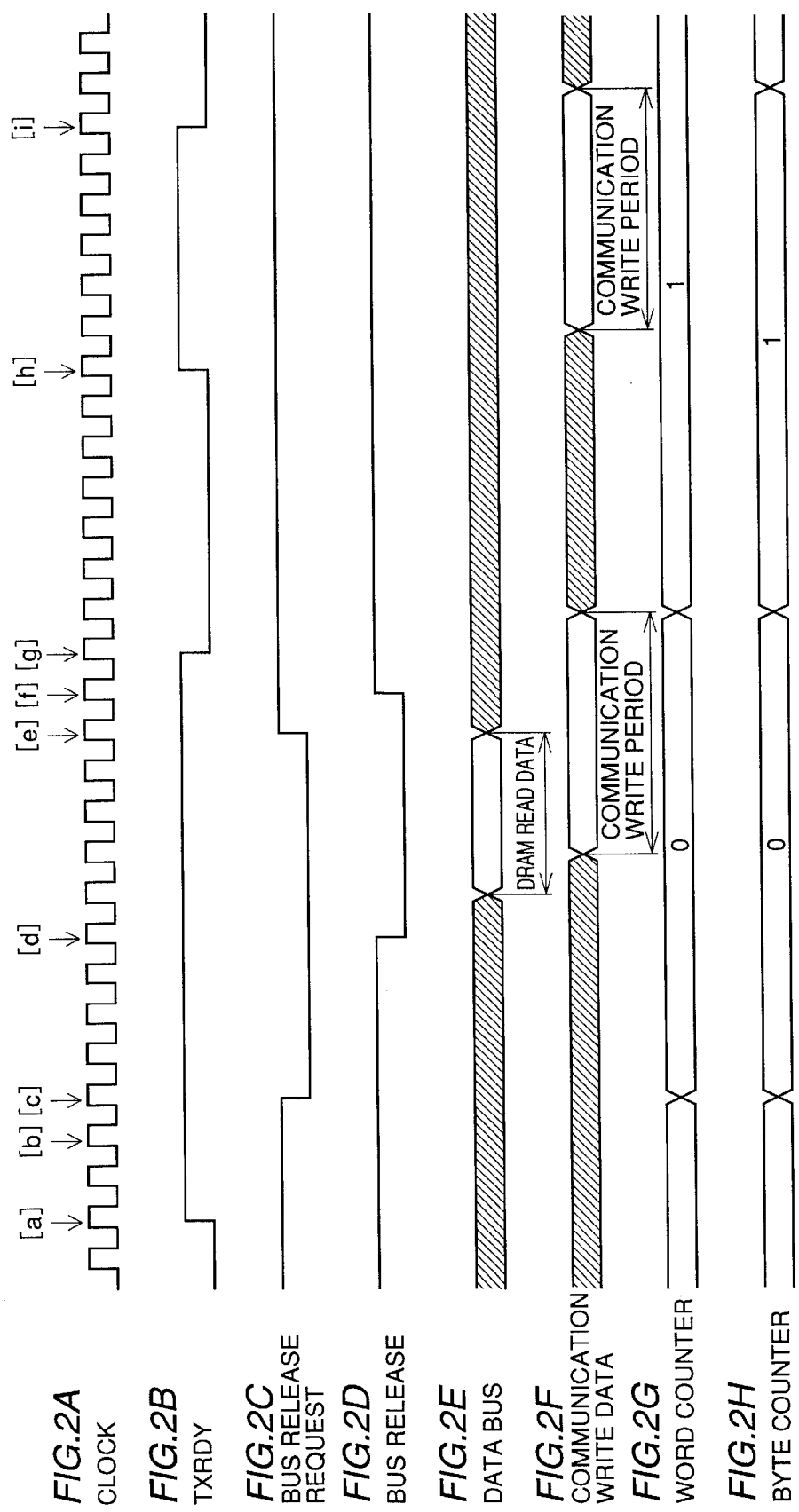

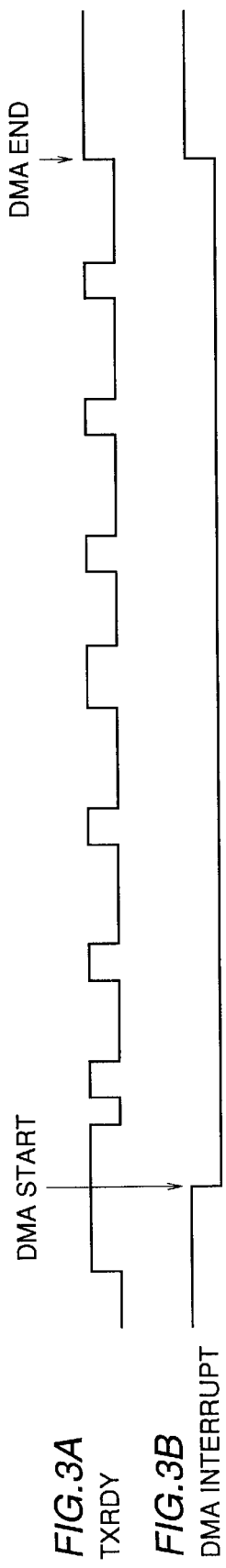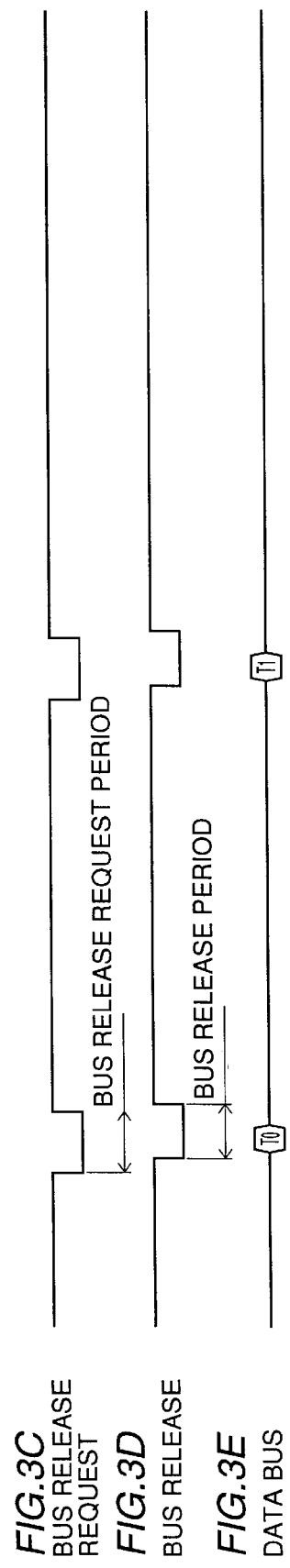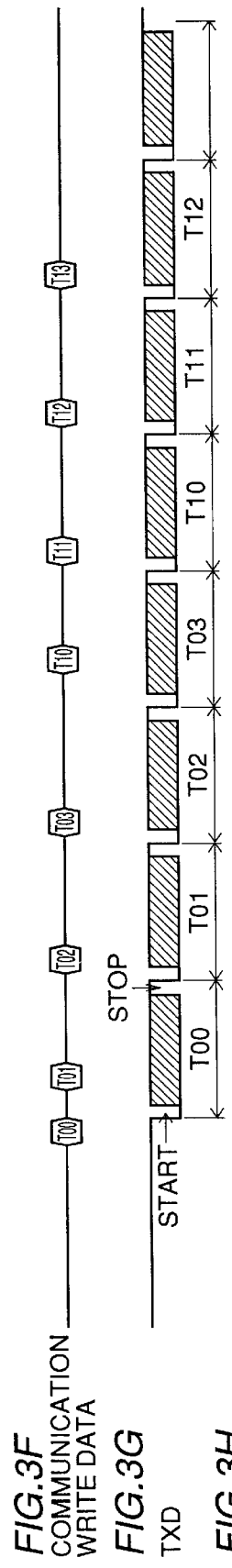

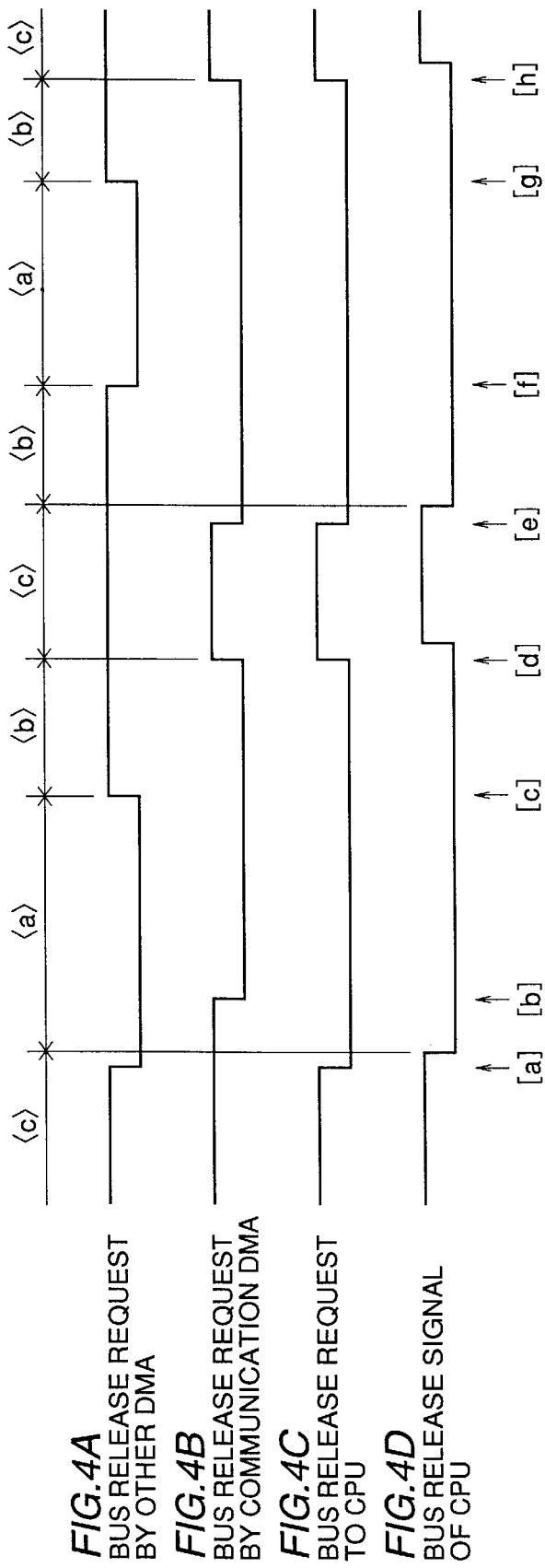

COMMUNICATION DMA DEVICE FOR FREEING THE DATA BUS FROM THE CPU AND OUTPUTTING DIVIDED DATA

TECHNICAL FIELD

The present invention relates to a communication DMA device, and more specifically to a communication DMA device that frees the data bus from the CPU and allows image data stored in a DRAM to be output via a communication channel in outputting image data of an image taken by a digital still camera to a personal computer.

BACKGROUND ART

Normally, in a digital still camera, image data of an image taken can be stored in a DRAM, and the CPU can read the stored image data and transfer the data to a recording medium to be saved as an image, or the data can be transferred to a display device to project the image. A DRAM can utilize the area other than the image data area as a work area for various processing. For instance, when image data is transferred to a personal computer by serial communication interface, a recording medium stores image data usually compressed in JPEG format, image data of a suitable size for transmission is read therefrom and is temporarily written into the work area of the DRAM, and thereafter the CPU reads the image data as transmission data and writes the data into a communication circuit, thereby the transmission data is serially output.

When the transmission of all image data to the work area is completed by repeating the above processing, image data of a suitable size for next transmission is read out and is written into the DRAM, and the same processing as above is repeated to continue the transmission.

In order to speed up the communication, however, the CPU must be monopolized by the communication control so that other processing cannot be performed during this time. In addition, the CPU seldom controls a camera using a 8 bit bus, but generally controls it using a 16 bit to 32 bit bus.

On the other hand, communication processing generally involves a unit of 8 bits, and the well-known asynchronous/synchronous communication chip 8251 is also processed by 8 bits. Therefore, supposing that the CPU that controls utilizes a 32 bit bus, the data is divided into 4 bytes, i. e. bits 7 to 0, 15 to 8, 23 to 16, and 31 to 24. Although the data of bits 7 to 0 can be directly written into the communication circuit, data from bits 31 to 8 must be written into the communication circuit after being allocated again to bits 7 to 0. Thus, a greater load is imposed upon the CPU than when 32 bits of data is transferred at once, and as a result, the processing speed of the CPU becomes slower. In particular, when transferring image data directly from the camera to a printer, a very high-speed transmission is required, which has surpassed the processing capability of the CPU.

Thus, the present invention provides a communication DMA device that lightens the load for the CPU while allowing a high-speed transfer.

DISCLOSURE OF THE INVENTION

The present invention is a communication DMA device, with a CPU, a communication circuit and a memory sharing a data bus, for outputting to the outside via the communication circuit transmission data stored in the memory; wherein the information indicating an area of the memory in which data to be transmitted is stored, the information indicating the capacity of the data to be transmitted, and the information indicating the start of communication are stored in a register; release of the data bus from the CPU is requested in order to allow reading of the transmission data of a prescribed bit width from the memory; the data bus is immediately connected to the CPU by a bus switching request circuit after the termination of the read operation; the data read from the memory via the data bus based on the information stored in the register is temporarily stored in a temporary storage circuit; and the data of a prescribed bit width stored temporarily is divided and output to the outside via the communication circuit several bits at a time.

Thus, according to the present invention, in performing the serial communication control, the CPU can carry out the transmission by executing several instructions, and the CPU is kept from being monopolized by the communication control so that the time spent on it can be used for other processing. Moreover, communication data once DMAed, or direct-memory-accessed is processed for transmission by monitoring the flag of the communication circuit regardless of the state of the data bus so that transmission with no intermission between one transmission data and another is achieved. Furthermore, since the period during which DMA for communication monopolizes the data bus can made short, such monopolization seldom interferes with the CPU processing, and as a result, not only the high speed communication but also the high speed processing of the overall system is achieved.

In a more preferred embodiment, the number of times data is read from the memory or the number of times data is provided to the communication circuit is counted by a counting circuit, and the count value is output to the data bus to allow the CPU to read the count value via the data bus.

In another preferred embodiment, when some other device requests for release of the data bus and when the bus release request is made first by the other device, the data bus is freed for the other device and the communication DMA device carries out processing after processing by the other device is complete; and when the bus release request is made first by the communication DMA device and the other device requests for bus release during processing by the communication DMA device, the processing is immediately stopped by the communication DMA device, the data bus is handed over to the other device, and after processing by the other device is complete, the data bus is returned to the communication DMA device and the processing resumes.

BRIEF DESCRIPTION OF THE DRAWINGS

FIGS. 2A to 2H are timing charts illustrating the timing of DMA processing for transmission.

FIGS. 3A to 3I are timing charts illustrating the write control timing of transmission data during DMA for transmission.

FIGS. 4A to 4D are timing charts illustrating the bus control during DMA for transmission.

BEST MODES FOR CARRYING OUT THE INVENTION

Figure 1:
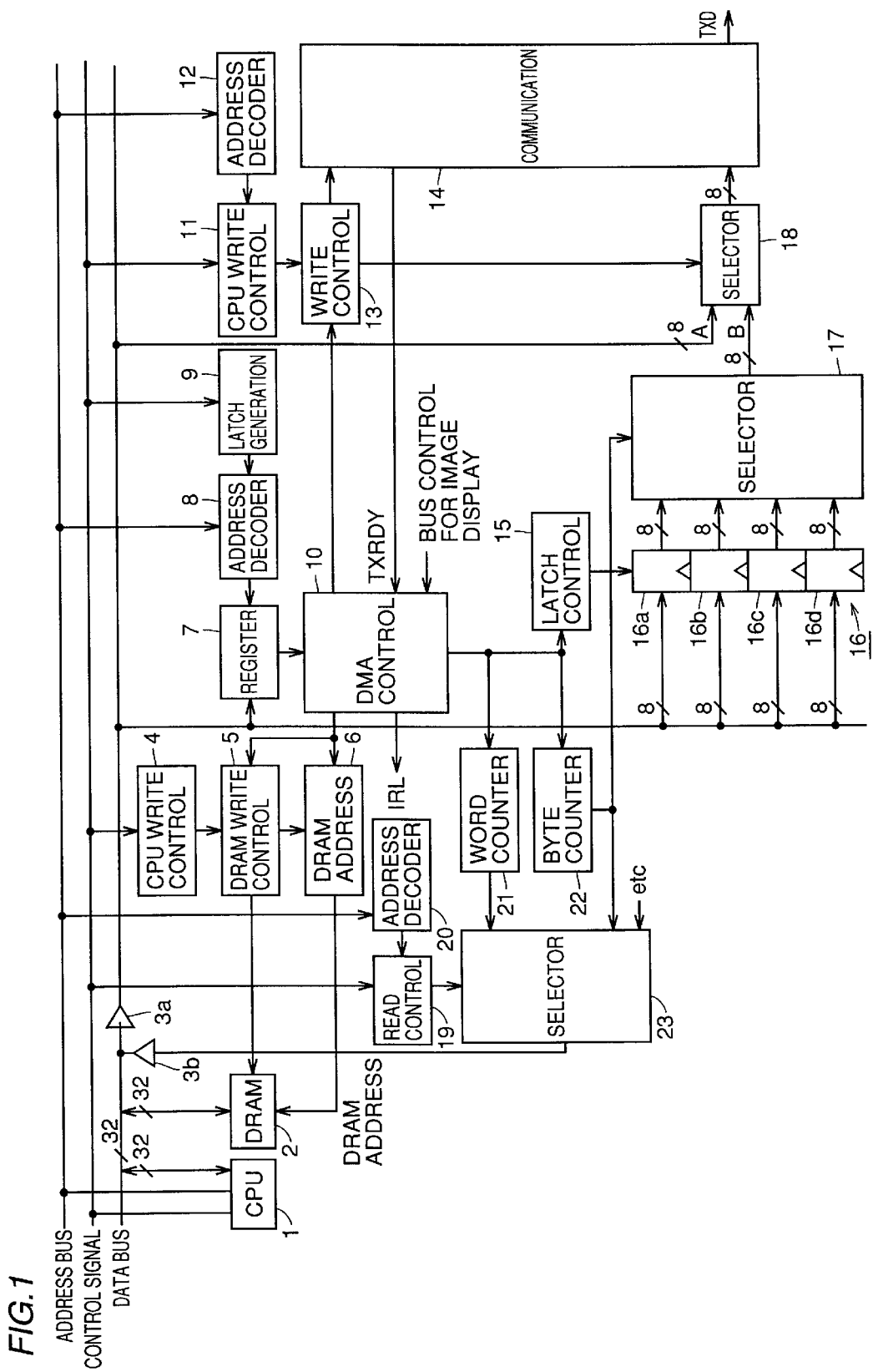
FIG. 1 is a circuit diagram of an embodiment of the present invention.

For a more detailed description, the present invention will be described according to the accompanying drawings. As seen in FIG. 1, the data bus for a CPU 1 is formed with a width of 32 bits, and a DRAM 2, as well as a register 7, a transmission buffer 16, and a selector 18 via an input buffer 3a, is connected to the data bus. DRAM 2 stores image data of the images taken by a digital still camera as transfer data. A CPU write control circuit 4, a DMA write control circuit 5, and a DRAM address circuit 6 are provided so as to write control the DRAM 2.

When CPU 1 is cut off from the data bus, a DMA control circuit 10 performs the DMA control for reading the data stored in DRAM 2 without involving CPU 1. CPU 1 stores a storage lead address of DRAM 2, an address width, and a transfer start flag in register 7 via an address decoder 8, and DMA control circuit 10 reads data from DRAM 2 based on these control data. The data read out is provided to transmission buffer 16. Transmission buffer 16 has areas 16a to 16d, each for storing one byte of the 4 bytes of data. Each byte of data is selected by selector 17, and further, is written into a communication circuit 14 via selector 18 and output to the outside.

A word counter 21 counts the number of words of the data written into communication circuit 14, while a byte counter 22 similarly counts the number of bytes. When connected with the data bus, CPU 1 can read the count values of word counter 21 and of byte counter 22 via an output buffer 3b and a selector 23 by the control of a read control circuit 19 and an address decoder 20.

Now, a specific operation of the embodiment shown in FIG. 1 will be described. Communication circuit 14 is one that is compatible with 8251. An 8251 communication circuit in its initialized state awaits the mode setting. Thus, CPU 1 is required to write the mode data into communication circuit 14. A CPU write control circuit 11 and an address decoder 12 have addresses for communication circuitry allocated in advance, and when CPU 1 performs the processing to write into the address corresponding to a mode/command of communication circuit 14, the data for mode is written into communication circuit 14 via a write control circuit 13 and selector 18.

For asynchronous communication, for instance, the mode data sets the start bit and the stop bit each to be 1 bit, the character length to be 8 bits, and the baud rate to be ×16 mode. When mode setting is complete, communication circuit 14 awaits the command setting, and the command is set by CPU 1 once again writing into the same address. Here, the transmission enable is set to the active state.

When the transmission enable is set to the active state, the transmission data is written into communication circuit 14 so that the written data is serially output. Moreover, when the transmission enable is activated, a transmission ready signal (TXRDY) is activated. Further, the transferred data has been written into DRAM 2 by CPU 1 in advance via CPU write control circuit 4, DRAM write control circuit 5, and DRAM address circuit 6.

Then, in this condition, setting of DMA control circuit 10 is performed. The setting is controlled by register 7, address decoder 8, and a latch generation circuit 9. An address is allocated for each of the several registers controlling DMA control circuit 10, and the control data from CPU 1 is stored in a prescribed register. The control data, as described earlier, include a storage lead address for indicating the area of DRAM 2 that stores the transfer data, the address width, and the transfer start flag. When, first, the area of DRAM 2 is set and, then, the transfer start flag is activated, one word of data is read from DRAM 2 as a first transfer data. This word equals the data width of CPU 1, which in this case is 32 bits.

The data read by DMA control circuit 10 is stored temporarily in transmission buffer 16 by the latch control of a latch control circuit 15. Then, the 32 bit transfer data is stored into areas 16a to 16d one byte per area. Each time byte counter 22 counts up by one byte, selector 17 is switched, and by selecting the input of selector 18 on the side of the transmission buffer, the buffer for bits 8 to 0 is selected, and the data therefrom is written as transmission data into communication circuit 14 by write control circuit 13.

FIGS. 2A to 2H are timing charts illustrating the timing of DMA processing for transmission. Now, a more specific description will be given with reference to FIGS. 2A to 2H. The timing of [a] in FIG. 2A indicates that the transmission enable of communication circuit 14 is set to the active state with the rise of the clock signal, and that the transmission ready signal (TXRDY) shown in FIG. 2B is activated. After TXRDY is activated, the transfer start flag is set to the active state at the timing indicated by [b]. Here, it is to be understood that the setting relating to the area of DRAM 2 is already performed. When DMA control circuit 10 detects the transfer start flag, an interrupt flag IRL is disabled, and DMA control circuit 10 requests CPU 1 to free the data bus at the timing of [c] as shown in FIG. 2C.

At the same time, the address of DRAM 2 is connected to the lead address, and the respective count values of word counter 21 and byte counter 22 shown in FIGS. 2G and 2H are respectively set to 0. CPU 1 receives the bus release request, and after completing its access to the data bus, notifies that it has freed the bus at [d] as shown in FIG. 2D. Upon detection of the release of the bus, DMA control circuit 10 reads from DRAM 2 the data that is set to DRAM 2 and having a one-word lead address, while at the same time stores the data in transmission buffer 16. When data is read from DRAM 2 at the timing of [e], the bus release request is cancelled, and CPU 1 cancels the release of the bus at the timing of [f].

On the other hand, when the data inside transmission buffer 16 is written into communication channel 14, TXRDY becomes disabled at the timing of [g], and the count values of word counter 21 and byte counter 22 are incremented assuming that 1 byte of data in one word has been transmitted, while the address of DRAM 2 is incremented by DRAM address circuit 6. At the same time, communication circuit 14 outputs serial transmission data, and waits for another TXRDY to be provided.

When the transmission data is transmitted from communication circuit 14, the transmission ready signal becomes active once again at the timing of [h]. Byte counter 22 counts the not-yet-transmitted data within the one word, selector 17 selects the data and writes the data into communication circuit 14, and byte counter 22 alone is incremented at the timing of [i]. Then, the transfer ready signal is disabled.

This operation is repeated until all the data of the one word is completely transmitted, and thereafter with the activation of the transmission ready signal, the processing from [c] to [g] is performed in reading the next word data from DRAM 2.

FIGS. 3A to 3I are timing charts illustrating the write control timing of transmission data of DMA for transmission. FIGS. 3A to 3I show the timing where the transfer of the word data takes place twice. It can be said that the above-described FIGS. 2A to 2H are enlarged versions of the timing shown in FIGS. 3A to 3I.

The first transfer word immediately after the start of transfer corresponds to T0 as shown in FIG. 3E. This first transfer word T0 is read from DRAM 2 and stored in transmission buffer 16, and 8 lower bits are selected. These 8 lower bits correspond to T00. When T00 is stored in communication circuit 14, T00 is serially output from TXD of communication circuit 14, as shown in FIG. 3G. According to the initial setting of 8251, first, one bit is output as a start bit, and then data corresponding to T00 is output. Finally, a stop bit is output, and the transmission of one byte is completed.

Thereafter, the write transmission from the second byte (T01) to the fourth byte (T03) to communication circuit 14 are successively repeated. The second byte (T01) is read from DRAM 2. Similarly, the fifth byte (T10) up to the eighth byte (T13) are processed. As shown in FIGS. 3H and 3I, word counter 21 counts up by 2, and byte counter 22 counts up by 4, and the corresponding data is written into communication circuit 14. When TXRDY shown in FIG. 3A is activated, DMA control circuit 10 recognizes the termination of DMA, and notifies CPU 1 of the termination by activating IRL as a termination interrupt signal for DMA. Thus, a series of processing is completed.

When the data bus is connected to CPU 1, the respective count values of word counter 21 and byte counter 22 are provided to CPU 1 via selector 23 by the control of read control circuit 19 and address decoder 20 so that CPU 1 can read the respective count values. Read control circuit 19 selects the data to be read according to a read control signal of CPU 1 and an address. Moreover, an address corresponding to the data to be read is assigned to address decoder 25, and the decode value is provided to the read control circuit 19. Selector 23 selects the data to be read according to a selecting signal from read control circuit 19. By reading this value, CPU 1 is able to grasp the progress of the transmission. Further, CPU 1 can calculate the number of remaining data even when DMA is interrupted upon receiving a request to stop transmission sent from the destination of the communication.

Furthermore, it is not only DMA of the communication circuitry that utilizes the data bus in operating the digital still camera as a system. Occasionally, the data bus is freed from CPU 1 to allow the read from/write into DRAM 2 in order to display an image. Since the display of an image must involve access at determined timing or the display would be affected, FIGS. 4A to 4D are diagrams illustrating the timing of the bus control during DMA for transmission. In FIGS. 4A to 4D, the block of image display circuitry requests for the bus release at the timing of [a]. In response to the request, CPU 1 terminates its access to the bus and frees the bus at that point. If the communication circuitry requests for the release of the bus at the timing of [b] shown in FIG. 4B, the communication circuitry monitors the bus release request from the image display circuitry, and since the image display circuitry is in the process of requesting for the bus release, the communication circuitry stands by for processing. If the image display circuitry cancels the bus release at the timing of [c] shown in FIG. 4C, the communication circuitry recognizes this and starts its processing. The processing of the communication circuitry ends at the timing of [d] and when the bus release is cancelled, CPU 1 connects itself to the bus.

Thus far, in the bus control, the period <a> is the processing period of the image display circuitry, the period <b> is the processing period of the communication circuitry, and the period <c> is the period during which CPU 1 is allowed to access the bus. Now, suppose that the communication circuitry once again requests for the bus release at the timing of [e]. CPU 1 frees the bus in response to the request and the communication circuitry starts processing. At this time, the image display circuitry requests for the bus release at the timing of [f]. The communication circuitry recognizes this, stops the processing, and hands over the bus to the image display circuitry. The image processing ends at the timing of [g], and the bus release request is cancelled. The communication circuitry recognizes this and resumes processing. The processing ends at the timing of [h], the bus release request is cancelled, and CPU 1 connects itself to the bus. The bus release request is returned to CPU 1 as ANDed signal between the image display circuitry and the communication circuitry, and during its bus release period, CPU 1 does not recognize which processing is being performed.

Industrial Applicability

As described above, the communication DMA device according to the present invention is suitable for freeing the data bus from the CPU and allowing image data stored in a DRAM to be output via a communication circuit in outputting image data of an image taken by a digital still camera to a personal computer.

What is claimed is:

1. A communication DMA device, with a CPU having a prescribed data bit width, a communication circuitry, and a memory sharing a data bus, for outputting to outside via said communication circuit transmission data connected to said memory, comprising:

a register for storing, by control from said CPU, information indicating an area of said memory in which data to be transmitted is stored, information indicating capacity of the data to be transmitted, and information indicating start of communication;

a bus switching requester for requesting said CPU for release of said data bus in order to allow reading of transmission data of said prescribed data bit width from said memory and for connecting said data bus to said CPU immediately after termination of the reading;

a temporary storager for temporarily storing data read from said memory via said data bus based on the information stored in said register; and a data outputter for dividing the data of said prescribed data bit width temporarily stored in said temporary storager and outputting the data to outside via said communication circuit several bits at a time.

2. The communication DMA device according to claim 1, wherein, when transmission of all data stored temporarily in said temporary storager is completed, next transmission data is read from said memory and transmission processing is repeated.

3. The communication DMA device according to claim 1, further comprising a counter for counting number of times data is read from said memory or number of times data is provided to said communication circuit, and outputting count value to said data bus; wherein said CPU reads the count value of said counter via said data bus.

4. The communication DMA device according to claim 1, wherein, when other device requests for release of said data bus and when bus release request is made first by the other device, the data bus is freed for the other device and said communication DMA device carries out processing after processing by the other device is complete; and when the bus release request is made first by said communication DMA device and the other device requests for bus release during processing by said communication DMA device, the processing is immediately stopped by said communication DMA device, said data bus is handed over to the other device, and after processing by the other device is complete, said data bus is returned to said communication DMA device and the processing resumes.

* * * * *